United States Patent Office 2,944,626
Patented July 12, 1960

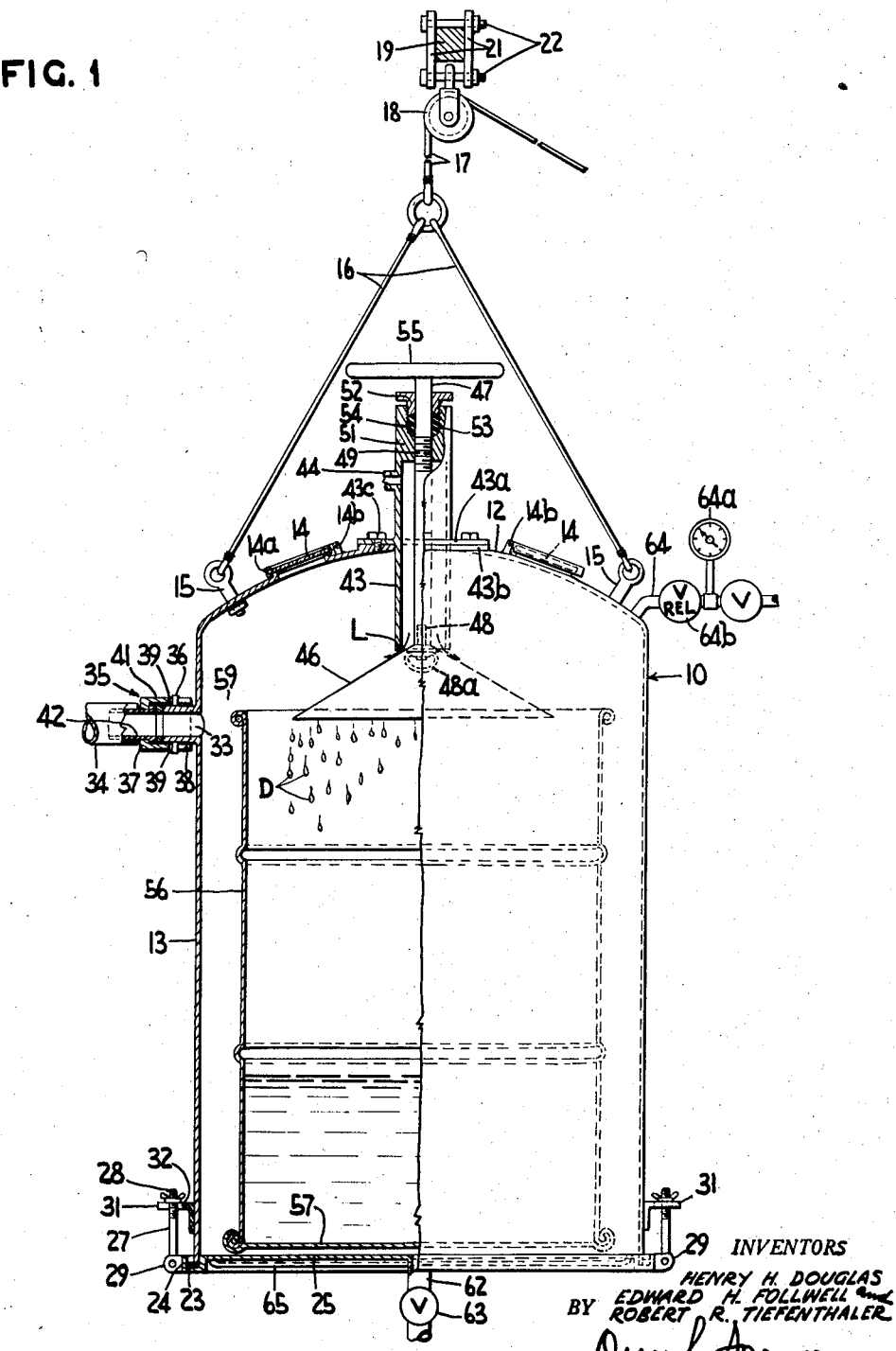

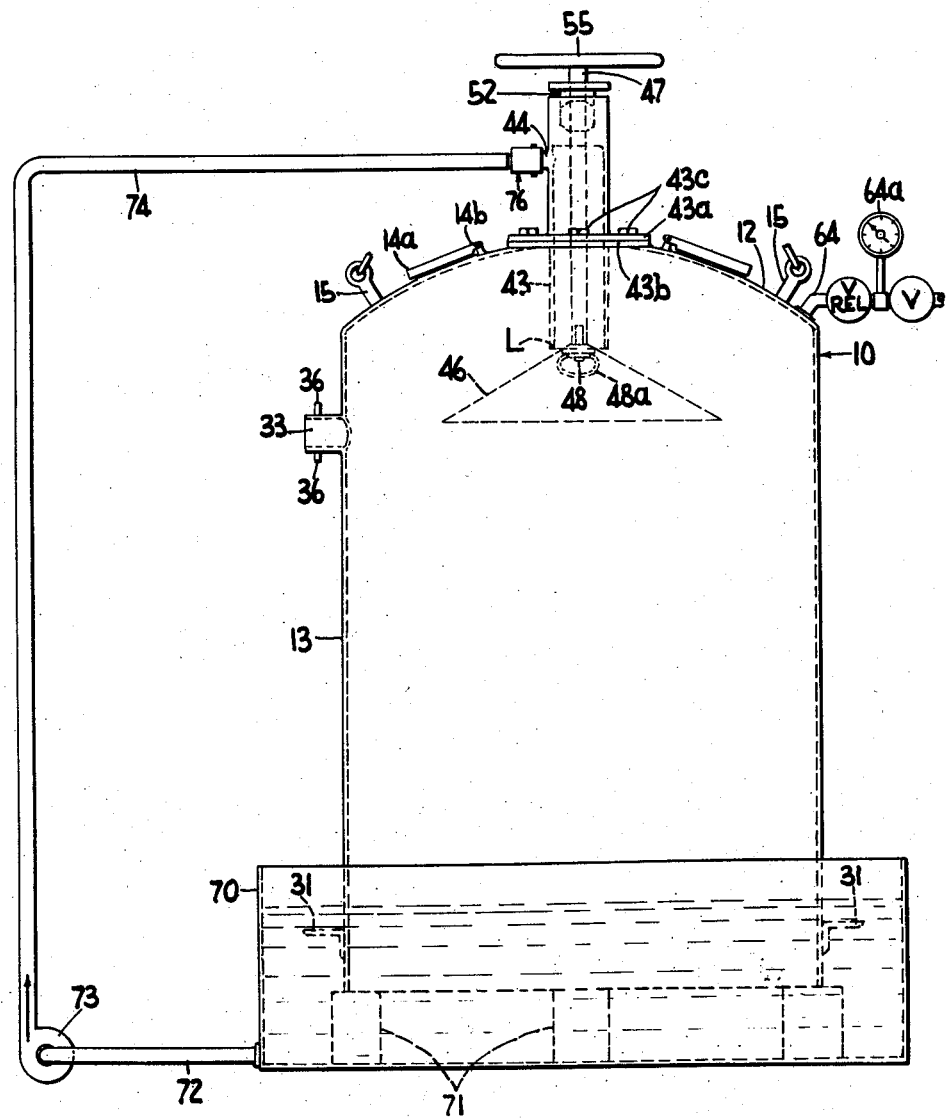

2,944,626
DEGASSING FLUIDS

Henry H. Douglas, Mountainside, Edward H. Follwell, Bloomfield, and Robert R. Tiefenthaler, Florham Park, N.J., assignors to Pittsburgh Plate Glass Company, a corporation of Pennsylvania Filed Apr. 25, 1957, Ser. No. 655,146

3 Claims. (Cl. 183—2.5)

This invention relates to removal to gaseous or volatile materials from fluids and it has particular relation to removal of gaseous or volatile materials from relatively viscous fluids such as coating compositions. The gases may be in the form of bubbles in the liquid and/or they may be dispersed as films about particles. They may also, to some extent exist in the absorbed state.

It has heretofore been observed that bubbles of gas tend to become entrapped or otherwise occluded in viscous liquids such as coating compositions of various types. This is especially true in those instances in which the formation or treatment of the composition involves agitation, beating, or kneading operations which tend to infold or otherwise to introduce bubbles of air or other gaseous media into the mass. The problem is particularly pronounced in those instances in which the fluid is highly viscous and/or pigmented and/or pasty in character and bubbles of gas move only very slowly therein. In normal course of events, the absorbed gases and bubbles may remain suspended for long periods of time in such fluids.

In order to eliminate bubbles from highly viscous liquids, it has heretofore been proposed to subject the liquids in containers to reduced pressures which tend to free absorbed gases and to increase the size of and to coalesce the bubbles and thus to facilitate the removal thereof.

In one of the more efficient embodiments of apparatus for effecting this treatment, viscous liquids are fed to the surface of a disc or bowl revolving at high speed in a vacuum chamber. The fluid is thus spread out as a thin flowing sheet which is exposed to vacuum to degas the same.

This type of apparatus is of high capacity and large volumes of liquids can be treated therewith in a relatively short period of time. However, the apparatus is rather complicated and expensive, especially for the treatment of small volumes of material. It is also, heavy and difficult to transport or move.

Moreover, the degasification is not always as complete as might have been desired. This is true at least in part because the period of exposure of the film upon the revolving disc or bowl is very brief, therefore, there is only a short period of time for the coalescence, growth and escape of the bubbles, or absorbed gases, or volatile liquids.

Furthermore, the apparatus is difficult to clean. Considerable time and effort is required to obtain thorough cleaning at the end of a run.

This invention comprises the provision of an apparatus for degassing or deaerating liquids and notably viscous liquids in which the foregoing difficulties are jointly or severally eliminated or reduced to a minimum. These desiderata are attained by provision of a vacuum chamber for treating the liquids which is equipped with an improved feeding and distributing device comprising a cone-like baffle which is made to function as a spreading device for liquid and also as a gate for regulating the flow of fluid through the inlet to the vacuum chamber.

As a still further feature, the apparatus may be constructed as a bell-like shell having a removable bottom permitting the insertion of shipping or storage containers as receivers for the liquid being degassed. The filled containers therefore, need not be emptied until the contents are to be used. The necessity of contacting the walls of the vacuum chamber with liquid, is thus reduced or eliminated with concomitant reduction of the loss of material and reduction of the labor in cleaning the apparatus at the end of a run.

This apparatus can be used to degas or deaerate substantially any material requiring such treatment, but it has been deemed to be particularly useful in treating highly viscous liquids which flow but slowly and which are therefore difficult to degas or to deaerate. The liquids, however, may be of any reasonable viscosity, from that of water to such viscosity that they will hardly move. The apparatus herein disclosed can be throttled to handle all viscosities. For example, the apparatus operates quite well with liquids of a high viscosity, e.g. of about 600; 25,000 or 30,000 centipoises. One type of material upon which the apparatus is particularly effective comprises the so-called "plastisols" which are viscous dispersions of about 10,000 to 30,000 centipoises comprising pulverulent polyvinyl chloride, or copolymers of vinyl chloride with other monomers, such as vinyl acetate, in liquid plasticizers such as dioctyl phthalate or other liquid ester type plasticizer. It will be appreciated that the polyvinyl chloride may be replaced, at least in part, by other dispersible plastic materials such as synthetic rubbers, polyvinyl acetate and others well known in the art. Many substituents for dioctyl phthalate constituting the plasticizer referred to are known and may be used in place of the latter in making up the plastisol compositions.

Plastisol compositions as articles per se are more fully elaborated upon in a commonly owned application to Donald P. Hart and Joseph E. Plasynski, filed January 16, 1957, Serial Number 634,564. In the plastisols, the polyvinyl chloride is essentially a dispersion of fine particles in the liquid plasticizer and in the curing of films of this material, the plasticizer is taken up into the plastisol to provide the ultimate hard, resistant film.

In forming plastisols, it is to be appreciated that the plasticizer and plastic material are milled together, along with other components such as modifying resins as above mentioned; pigments and the like. One common type of apparatus comprises a mill, or mixer of the type employed in mixing dough. In the milling operation, much gas is introduced into the liquid as bubbles and/or as films of gas around the particles and because of the viscosity of the liquid, its escape is very slow.

Before this material can be employed for coating purposes, it is necessary to remove a substantial amount of, or all of the bubbles introduced in the milling operation. Because of the viscosity of the material, which usually runs within the aforementioned range of about 10,000 to 30,000 centipoises, this is a relatively difficult operation in which the apparatus of this invention is outstandingly successful. Doubtless, there are many other viscous liquids which are also difficult to degasify or deaerate and the use of the present apparatus in such operation is contemplated, as is the degassing of more fluid materials from which gases can be more readily removed.

For more complete understanding of the invention, reference may now be had to the appended drawings in which like numerals refer to like parts throughout and in which:

Fig. 1 is a view partially in section and partially in elevation of a preferred form of the invention;

Fig. 2 is a similar view illustrating means for cleaning the apparatus.

The apparatus as shown, comprises a bell-like shell 10 of sheet steel or other appropriate material of suitable strength and durability. This shell comprises a dome-like top 12 and cylindrical side walls 13. The top as shown, is provided with glass windows as at 14, for viewing operations within the shell. If desired, one or more of the windows may be sealed in bezel ring 14a which is hinged as at 14b to the top of the shell whereby the window can be opened to facilitate cleaning of the shell. Needless to say, this operation can not be performed while vacuum is exerted in the shell. Obviously, the edge of the bezel should rest upon an appropriate gasket in order to insure a seal within the shell.

Eye bolts 15 may also be welded to the shell and by means of these, a spreader 16 of a tackle line 17 is attached for lifting purposes. The line is further passed over a suitable power multiplying device such as a differential pulley indicated schematically at 18. The latter in turn, is attached to a support such as a beam 19, by means of a clevis device comprising side plates 21 and tie bolts 22 drawing them toward each other.

The edge of the shell normally rests upon a gasket 23 of rubber or other soft, springy material in a groove 24 in a base plate 25, whereby to provide an air tight seal in the container.

In order to increase pressure upon the gasket, swing bolts 27 having nuts 28, may be attached to the edge of the base plate by means of brackets 29. As many bolts as may be required may be employed though for purposes of illustration, but two are shown. In some instances, these swing bolts may be eliminated entirely and reliance placed upon the weight of the shell and the external atmospheric pressure exerted upon the shell, when the latter is evacuated, to maintain a seal. Brackets 31, one for each swing bolt, are provided upon the lower portion of the side wall of the shell. These brackets have slots 32 receiving the swing bolts, whereby when the nuts of the latter are tightened, the shell and the base are drawn firmly together.

The shell further comprises a vacuum outlet as indicated at 33 which may be joined to an appropriate source of vacuum, for example, by a flexible hose 34. Preferably, the outlet 33 and the hose 34 are joined together by a snap connection 35 which may be of any convenient type. For purposes of illustration, it is shown as comprising projecting pins 36 upon the outlet and a sleeve 37 upon the end of the hose, said sleeve having bayonet slots 38 with lateral portions 39 providing cam surfaces so that when the sleeve is twisted, force is exerted upon the pins to draw the parts of the connection into firm engagement with each other. A washer or gasket 41 of rubber or other soft resilient material is also disposed within the sleeve in position to be compressed between the end of the outlet 33 and the end of the stem 42 of the coupling.

Apparatus to feed liquid to be degassed into the shell comprises an inlet tube 43 disposed centrally in the domed top portion 12 of the shell and projecting downwardly through the latter. The tube has a flange 43a welded thereupon. This flange rests upon a boss 43b upon the top of the shell and encircling the plate and is held in place by screws 43c. Obviously, a gasket (not shown) may be interposed between the flange and the boss to provide a seal. The inlet has a side arm 44 above the top portion 12 and this arm may be connected as for example by means of a snap connection (not shown) to a hose. The snap connection may be similar to that already described in connection with the vacuum line and further description thereof is not deemed to be necessary at this time. It will also be understood that the hose to the arm 44 is further joined to a convenient source of fluid to be degassed, for example to a hopper or a tank (not shown) containing the same. Flow may be by gravity or a pump (not shown) may also be employed to promote, or to meter the flow of fluid. In most instances, the vacuum within the shell is adequate to produce feed of the liquid to be deaerated. A single pump is thus made to serve the dual purpose of promoting flow of liquid to be deaerated and of producing vacuum to remove the gases.

Means to regulate the flow of liquid through the inlet and concurrently to spread the material as it flows as a thin, relatively uniform film or sheet, comprises a cone-like baffle 46 which is several times the diameter of the inlet tube 43. It also is disposed concentric with respect to the inlet 43 and the lip L of the latter acts as circular, or ring-like spreader blade, the axis of which coincides with the axis of the cone so that the material flowing downwardly through the inlet will be diverted outwardly and downwardly and the lip will wipe the sheet to a relatively uniform thickness to assure wetting of the baffle by the composition and uniform distribution and exposure of the material to vacuum. The baffle is joined at its apex with a vertical rod or shaft 47 by appropriate means, such as a chuck or a collar, or as shown for purposes of simplicity, by a screw 48 having a wing-like head or hand hold 48a and being threaded into the lower end of the rod and providing means whereby the baffle may be quickly attached or detached.

The rod, near its upper end, is further provided with a screw threaded portion 49, engaging similar threads of a plug 51 welded, or otherwise fixed in the upper end portion of the inlet 43. It should be sufficiently long definitely to guide and to center the rod. The upper end of the rod 47 further extends through a plug 52 threaded into the upper end of a gland 53 having a resilient packing 54, said packing being squeezed by the plug, whereby to provide a seal about the rod. The rod, at its extremity, is provided with a hand wheel 55 or other appropriate means whereby the shaft may be rotated thus to advance or retract the baffle 46 from the inlet 43. The wheel could also be replaced by a worm gear rotated by a worm, whereby to effect delicacy of control of the movement of the shaft.

The fluid is, in effect, extruded as a tube which, at its lower end, is expanded into a hollow cone, the thickness of the walls, of which, is controlled by adjustment of the position of baffle. In this way, the flow of fluid to the inlet is adjusted to meter the flow of fluid between the outlet and the baffle to attain any desired thickness of the film which is undergoing the deaeration. It will be appreciated that it is an advantage of the present construction that the fluid as it flows out of the inlet, is brought into intimate, wetting contact with the surface of the baffle. The flow down along the sides of the rod is uniform, so that the distribution of fluid upon the surface of the baffle in turn, is quite uniform. This is desirable for maximum efficiency in degasifying the material.

It will be noted that the surface of the baffle is disposed in such position with respect to the glass or glasses 14 as will facilitate optimum viewing of the film thereupon. It is thus possible to ascertain the degree of deaeration of the material without breaking the vacuum to admit of withdrawing samples for external examination.

The liquid upon the baffle 46 is in quiet stream flow so that there is but little or no spattering of the glasses or of the interior of the shell 10 by droplets thereof. Cleaning of the apparatus is thus reduced to a minor operation. If desired, such operation can often be even further facilitated by removing the screw 48 to admit of removing the baffle 46 from the rod 47 thus permitting the baffle to be cleaned as a separate unit, as by scraping or by washing. Free access is also thus provided to the inlet 43 to permit scraping or washing of the latter by means of a hand operated tool as may be desired.

A receiver for the liquid materials to be degassed is indicated as being a drum-like container 56 having a cylindrical side wall. This container is closed at its lower end by a bottom 57 rolled or crimped upon the lower edge of the wall. At its upper end, the container is provided with a rolled edge 59 providing a seat for a lid (not shown). The baffle 46, it will be observed, is disposed in contiguity to the top of the drum, but may be either somewhat above or below the latter, but in any event, it is desirable that the top be so positioned that the liquid material flowing down the baffle will fall into the container either as drops indicated at D, or as a more or less sheet-like flow, or a series of sheet-like flows.

Manifestly as the material falls downwardly, the degasification is continued further to complete the removal of any residual bubbles and absorbed gases which may be trapped. While the bubbles are falling, the material is exposed on all sides, thus permitting removal of bubbles which otherwise would be too deeply embedded in the material to escape.

The material, as it falls downwardly, strikes the body of liquid collected in the container and is spread out to a substantial degree over the surface thereof as the material accumulates, thus facilitating further and more prolonged exposure to the action of vacuum.

Normally, in the operation of the apparatus as described, fluid will be allowed to flow in through the inlet 43 at appropriate rate to obtain a desired degree of degassing action until the container is filled to an appropriate height, at which time, the baffle 46 may be closed by means of the hand wheel 55 to halt the flow of material. The material in the container may be allowed to stand, if desired, under vacuum for any desired length of time or the container can be removed immediately. To facilitate the removal, it is necessary that the vacuum be broken thus releasing the atmospheric pressure upon the container. The swing bolt 27 may then be released and the shell 10 can be lifted by means of the tackle apparatus. The container 56 may be closed with an appropriate lid or cover and set aside for shipment, or storage as may be required. When it is desired to resume operations, an empty container may be placed upon the base 25. The shell 10 may be returned to a position over a fresh container, the bolts 27 may be tightened and the hose connections for the supply of fluid and the application of vacuum restored. By operation of the hand wheel 55, the baffle 46 is again lowered to adjust the flow of fluid to the inlet to appropriate velocity, which can be conveniently observed through the sight holes 14 already referred to.

If the delay between the removal of one container and the replacement thereof by an unfilled container is substantial, or if there is to be a change in the composition to be deaerated, it may be desirable to clean the baffle 46 and the inlet 43 before operations are resumed.

If extended runs are to be conducted with the foregoing apparatus, or if there is no particular objection to substantial cleaning operations at the end of a run the fluid from the inlet 43, after it has flowed down the baffle 46 may be allowed to fall directly into the shell 10. In order to permit the deaerated fluid in the bottom of the shell to be drained, the bottom 25 is provided with an outlet conduit 62 having a valve 63. When the apparatus is operated without the container 56 in place, the valve 63 is closed and the fluid is allowed to collect until the shell 10 is adequately filled, or until a run is completed. The vacuum is then shut off, the valve 63 is opened and the degassed fluid allowed to drain away to appropriate containers.

In those instances in which the fluid is relatively viscous it may sometimes be desirable to expedite the flow of fluid through line 62 by appropriate means. For example, vacuum may be applied to the receiver (not shown) to accelerate the flow.

If preferred, the vacuum line 34 may be connected to a source of gas under pressure or may be replaced by a pressure line. A line 64 having a pressure gauge 64a and a pressure relief valve 64b may be tapped into the dome of the shell, thus providing means for applying pressure. Needless to say, if pressure is to be applied within the shell the bottom 25 must be securely fastened in place as by tightening the swing bolts 27, or if desired, the containers 56 may be inserted in position in the shell and the deaerated fluid allowed to drain in the same until it is full and the material drains over the upper edge and flows down the side walls of the container. In so doing, a thin film on the shell is further exposed to vacuum, thus increasing the length of time of treatment. For purposes of permitting the draining off of the material, the bottom or base plate 25 may be provided with radially directed corrugations 65 which permit the degassed fluid to flow under the bottom 57 of the container and out of the outlet 62. If the large hold-back of material in the container 56 is undesirable, the latter may be closed, or may be replaced by another cylindrical body which is closed at both ends so that liquids are not retained therein, but drain down the outer perimeter.

Particular emphasis has been placed upon degassing or deaerating viscous liquids. The foregoing apparatus may also be used to remove volatile constituents such as solvents from viscous liquids.

In Fig. 2 is illustrated an appropriate embodiment of apparatus for cleansing the deaerator as disclosed in Fig. 1. The apparatus comprises an open container 70 for solvent, or other medium adapted to flush the surface of the deaerator apparatus. As shown in Fig. 2, the apparatus includes appropriate means, such as blocks 71 adapted to hold the bottom of the shell 10 above the bottom of the container in order to permit the free flow of fluid from the shell. Obviously, other means for supporting the shell with the bottom edge thereof in spaced relationship to the bottom of the container may be employed. For example, the shell may be held in suspended position by the tackle apparatus illustrated in Fig. 1 but with the lower edge immersed in or supported above the liquid in container 70.

Circulation of cleaning fluid through the shell and the appurtenances thereof is effected by means of a conduit 72 providing an outlet near the bottom of the container and being provided with flow promoting means such as centrifugal pump indicated diagrammatically at 73. The upper portion 74 of the conduit is provided at its terminus with a suitable snap connection, e.g. a pin connection 76 corresponding to the connection 35 illustrated in Fig. 1 and being adapted to provide a fluid-tight connection with the arm 44 of the inlet tube 43.

By operating the pump 73 with an appropriate supply of fluid in the container 70, fluid is caused to discharge downwardly through the inlet tube 43 and over the cone 46 thus effectively cleaning the inlet tube and all portions of the apparatus which are likely to come into contact with the fluid being degassified.

Obviously, other embodiments of apparatus could be employed for cleaning the construction shown in Fig. 1. For example, a drum such as is shown in Fig. 1 could be set in the shell 10 to catch wash liquid which can then be pumped in through inlet arm 44 to wash the same along with inlet 43 and cone 46. Indeed, the cleaning operation may readily be performed manually, if so desired.

The forms of the invention illustrated are by way of example. It will be apparent to those skilled in the art that numerous modifications may be made therein without departure from the spirit of the invention or the scope of the appended claims.

We claim:

1. Apparatus for degassing a viscous liquid comprising a shell, means to apply vacuum within the shell, means to feed viscous liquid to be degassed to the shell, the latter means comprising a feed line having an outlet portion discharging downwardly into the top of the shell and having a circular lip upon the lower extremity thereof, a cone-like baffle disposed below the outlet portion with the apex thereof disposed coaxially upward with respect to the lip and having a base diameter several times greater than the diameter of the lip, whereby to distribute the liquid as it emerges from the outlet portion as a thin, flowing sheet, and means to vary the distance between the lip and the apex of the baffle from closed position to a position wherein the rate of flow is controlled to spread the liquid by wiping action of the lip acting as a circular blade about the apex of the baffle to form a uniform film for degassing, the film being exposed to vacuum while flowing upon the baffle and being further exposed to vacuum as it drips from the edge of the baffle.

2. Apparatus for degassing viscous liquids comprising a bell-like shell receiving a container to be filled with degassed liquid, a detachable bottom of the shell upon which the lower edge of the shell rests, a gasket between the edge and the bottom, sealing against the entrance of air into the shell, latch means detachably to secure the shell upon the bottom, means to apply vacuum to the shell, means to feed a viscous liquid to be degassed to the shell, the latter means comprising a feed line having an outlet portion discharging downwardly into the top of the shell and having a circular lip upon the lower extremity thereof, a cone-like baffle disposed below the outlet portion with the apex thereof disposed coaxially upward with respect to the lip and having a base diameter several times greater than the diameter of the lip, and supporting the liquid as it emerges from the outlet portion as a thin, flowing sheet, and means to vary the distance between the lip and the apex of the baffle from closed position to a position wherein the rate of flow is controlled and the liquid is spread to form said flowing sheet suitable for degassing, by wiping action of the lip acting as a circular blade about the apex of said baffle, the film being exposed to vacuum while flowing upon the baffle and being further exposed to vacuum as it drips from the edge of the baffle.

3. Apparatus as defined in claim 2 in which a sight window is provided in the top of the shell to provide means allowing the operator to observe the filling operation.

References Cited in the file of this patent

UNITED STATES PATENTS

| | | |
|---|---|---|
| 1,145,047 | Wiedemann et al. | July 6, 1915 |
| 1,575,287 | Spindler | Mar. 2, 1926 |
| 2,404,468 | Vokes et al. | July 23, 1946 |
| 2,668,598 | Seed | Feb. 9, 1954 |
| 2,714,938 | Smith | Aug. 9, 1955 |
| 2,748,886 | Wildebour | June 5, 1956 |

FOREIGN PATENTS

| | | |
|---|---|---|
| 393,094 | Great Britain | June 1, 1933 |
| 713,602 | Germany | Nov. 11, 1941 |